(12) United States Patent
Yee et al.

(10) Patent No.: US 12,131,209 B1
(45) Date of Patent: Oct. 29, 2024

(54) TRANSACTION CARD WITH REMOVABLE SHEATH

(71) Applicant: Capital One Services, LLC, McLean, VA (US)

(72) Inventors: Bryant Yee, Silver Spring, MD (US); Samuel Rapowitz, Atlanta, GA (US); Armando Martinez Stone, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/505,587

(22) Filed: Nov. 9, 2023

(51) Int. Cl.
*G06K 19/077* (2006.01)
(52) U.S. Cl.
CPC .............................. *G06K 19/07737* (2013.01)
(58) Field of Classification Search
CPC ....... G06K 19/07737; G06K 19/07739; G06K 19/07741; G06K 19/005
See application file for complete search history.

(56) References Cited

U.S. PATENT DOCUMENTS

| 5,326,964 | A | * | 7/1994 | Risser | B42D 25/20 |
| | | | | | 235/487 |
| 8,302,858 | B2 | | 11/2012 | Eng et al. | |
| 9,907,375 | B1 | | 3/2018 | Kitchen | |
| 11,564,466 | B2 | | 1/2023 | Clarete et al. | |

* cited by examiner

*Primary Examiner* — Suezu Ellis
(74) *Attorney, Agent, or Firm* — Bookoff McAndrews, PLLC (57) ABSTRACT

A transaction card assembly is described including: a card body including a Europay, Mastercard, and Visa (EMV) chip and a receiving portion; a removable sheath component including visible cardholder information and an attachment portion; wherein, in a first configuration, the removable sheath component is coupled to the card body via engagement between the receiving portion and the attachment portion, and in a second configuration, the removable sheath component is uncoupled from the card body by disengagement between the attachment portion and the receiving portion, and wherein, in the first configuration, the visible cardholder information is obfuscated by the card body.

20 Claims, 6 Drawing Sheets

TRANSACTION CARD WITH REMOVABLE SHEATH

TECHNICAL FIELD

Various embodiments of the present disclosure relate generally to payment or other transaction cards and, more particularly, to transaction cards having a removable portion to selectively obscure transaction information and to provide a card for use as tender that does not include visible cardholder information.

BACKGROUND

Transaction cards may display visible information such as the card number, expiration date, and card verification value (CVV). For some methods of transacting, such as some online purchases, these numbers are sufficient to authorize a transaction, and other methods of transaction may only require one additional piece of information, such as a cardholder's zip code or phone number. While the visible elements of transaction or account information may be obscured prior to use, it is often necessary to have the card in view for some period of time, for example, during a transaction or when a transaction card is given to a merchant or other third party, such as a waiter at a restaurant, to authorize a transaction. Such visibility of information may expose an account holder to fraudsters.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, payment, transaction, or other cards having a card body and a removable sheath and related methods are disclosed.

In some aspects, the assemblies and methods described herein relate to a transaction card assembly, including: a card body including a Europay, Mastercard, and Visa (EMV) chip and a receiving portion; a removable sheath component including visible cardholder information and an attachment portion; wherein, in a first configuration, the removable sheath component is coupled to the card body via engagement between the receiving portion and the attachment portion, and in a second configuration, the removable sheath component is uncoupled from the card body by disengagement between the attachment portion and the receiving portion, and wherein, in the first configuration, the visible cardholder information is obfuscated by the card body.

In some aspects, the assemblies and methods described herein relate to a transaction card assembly, including: a card body including a first face and a second face opposite the first face; an EMV chip disposed on the first face of the card body; a magnetic strip disposed on the second face of the card body; a receiving portion formed on the card body; and a removable sheath component including a first sheath face and a second sheath face opposite the first sheath face; visible cardholder information disposed on the first sheath face of the removable sheath component; an attachment portion formed on the removable sheath component; wherein, in a first configuration, the removable sheath component is coupled to the card body by engagement between the receiving portion and the attachment portion, and in a second configuration, the removable sheath component is uncoupled from the card body by disengagement between the attachment portion and the receiving portion, and wherein, in the first configuration, the card body obfuscates a portion of the first sheath face of the removable sheath component including the visible cardholder information.

In some aspects, the assemblies and methods described herein relate to a transaction card assembly, including: a card body including an EMV chip and a receiving portion; a removable sheath component including visible cardholder information and an attachment portion; wherein, in a first configuration, the removable sheath component is coupled to the card body via engagement between the receiving portion and the attachment portion, and in a second configuration, the removable sheath component is uncoupled from the card body by disengagement between the attachment portion and the receiving portion, wherein: in the first configuration, the visible cardholder information is obfuscated by the card body, and in the second configuration, the removable sheath is removed from the card body, and the removable sheath and the card body are both enabled for active use as tender.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially," "approximately," and "generally," are used to indicate a possible variation of ±10% of a stated or understood value.

Terms like "source," "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. As used herein, terms like "user" or "customer" or "cardholder" generally encompasses any person or entity that may desire information, resolution of an issue, purchase of a product, or engage in any other type of interaction with a provider.

In general, the present disclosure is directed to payment, transaction, or other cards and, more particularly, to transaction cards having a card body and a removable sheath. Cardholders may have the optionality of separating their transaction cards into two components: the card body, which may include one or more elements that make the card body usable as tender, such as a Europay, Mastercard, and Visa (EMV) chip, an antenna, and a magnetic strip, and the sheath, which may also include one or more elements that make the sheath usable as tender, such as a magnetic strip and cardholder information. The card body may, in an exemplary embodiment, include one or more of an EMV chip, an antenna, and a magnetic strip, but may be devoid of visible cardholder information. In the same exemplary embodiment, or another embodiment, the sheath may include the visible cardholder information and be removable from the card body, such that the card body may be uncoupled (e.g., completely separable) from the sheath and provided to a merchant or other party, such as a waiter in a restaurant, without providing the other party access to the cardholder's visible information. Additionally, the card body may obfuscate the cardholder information in a coupled configuration, such that cardholder information is not visible in the coupled configuration. In the first configuration, the visible cardholder information is obfuscated by the card body, and in the second configuration, the removable sheath is removed from the card body, and the removable sheath and the card body are both enabled for active use as tender.

Cardholders may use the transaction card either in a coupled (e.g., connected) configuration in which the card body and the removable sheath are connected to each other, or have the transaction card in an uncoupled (e.g., separated configuration), where the card body and the removable sheath are separated from each other. The two components may be attached and separated in a number of manners, such as by snap fits, slidable engagement with each other, using magnets to snap the two components to each other, or other modes of engagement and disengagement to be described in more detail below.

In the separated configuration, either one of or both of the card body and the removable sheath may include elements that make the components usable as tender. For example, the card body may include one or more of an EMV chip, an antenna for touch-free transactions, or a magnetic strip. The removable sheath may include a magnetic strip and visible cardholder information. This allows for a cardholder to use just one or the other component of the transaction card, so that only one component is necessary to be provided to a third party that may run the transaction.

Figure 1A:
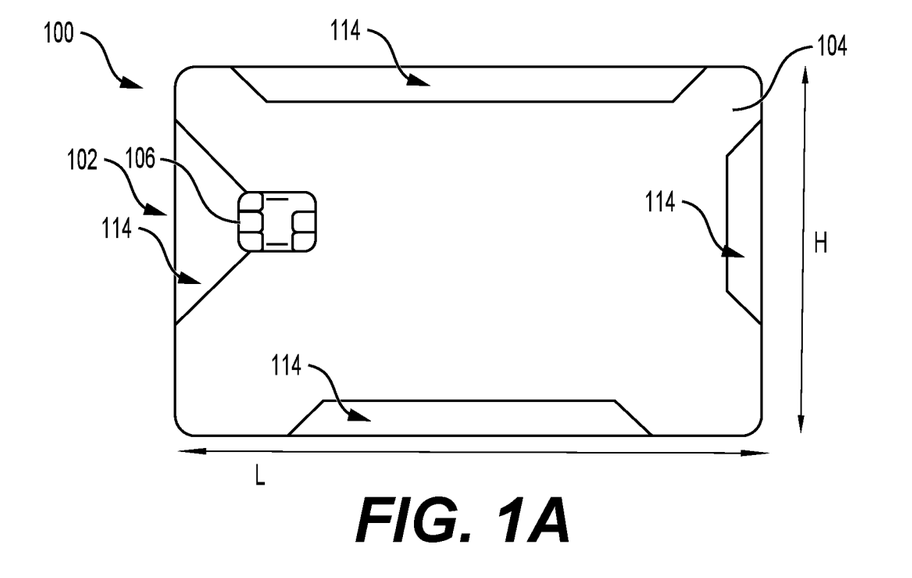
FIG. 1A depicts a front-perspective view of an exemplary transaction card in a coupled configuration, consistent with one or more embodiments of the present disclosure.
Figure 1B:
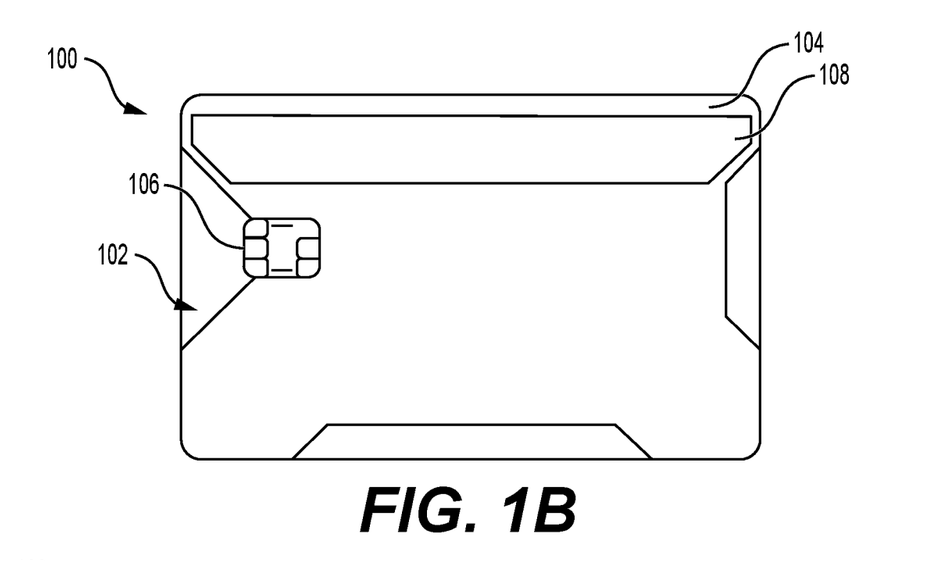
FIG. 1B depicts a front-perspective view of an exemplary transaction card in a coupled configuration, consistent with one or more embodiments of the present disclosure.
Figure 1C:
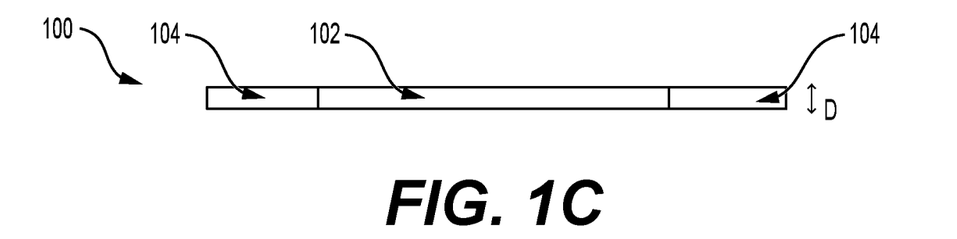
FIG. 1C depicts a side-perspective view of an exemplary transaction card in a coupled configuration, consistent with one or more embodiments of the present disclosure.

FIG. 1A-1C depict an exemplary transaction card 100, consistent with one or more embodiments of the present disclosure. Transaction card 100 may be any physical card product configured to store information, such as financial information (e.g., card numbers, account numbers, etc.), quasi-financial information (e.g., rewards balance, discount information, etc.), information pertaining to a transaction (e.g., transaction status, transaction amount, etc.) and/or individual-identifying information (e.g., name, address, etc.). Examples of transaction cards include, but are not limited to, credit cards, debit cards, gift cards, rewards cards, frequent flyer cards, merchant-specific cards, rewards cards, travel cards (e.g., a train pass, a bus pass, etc.), discount cards, insurance cards, identification cards, and driver's licenses. Accordingly, the term "transaction" should be construed broadly to include any presentation or transfer of information associated with the transaction card.

In some embodiments, transaction card 100 may comprise an assembly including a first component, card body 102, and a second component, removable sheath 104. Card body 102 is substantially rectangular with four corner portions, with a height H extending in a vertical direction, and a length L extending in a horizontal direction perpendicular to the vertical direction, wherein the length L is greater than the height H. Card body 102 may be composed of any relatively light-weight, rigid material similar to that of a conventional transaction card, such as a plastic material, and may include thereon an EMV chip 106, an antenna (not shown) positioned in or on card body 102 for conducting wireless transactions, and a magnetic strip, in some embodiments on a side of card body 102 facing away from EMV chip 106 and facing toward removable sheath 104 when in a coupled configuration as shown in FIG. 1A).

Removable sheath 104 may be disposed atop card body 102 in a coupled manner as shown in FIG. 1A, with some portions 114 of card body 102 exposed by way of cut-outs 128 (see FIG. 2A) formed in removable sheath 104 even when the two are coupled. Removable sheath 104 may be composed of silicone, metal, a rigid plastic, or other durable materials. As shown in FIG. 1B, optionally, removable sheath 104 may also include a magnetic strip 108. This magnetic strip 108 on the removable sheath 104 may be in addition to the magnetic strip on the card body 102, or in some embodiments there may be no magnetic strip on the card body 102 and only the magnetic strip on the removable sheath 104. The cut-outs 128 in removable sheath may be formed so as to give the removable sheath 104 a generally X-shaped configuration, with the removable sheath 104 extending to each of the corners of card body 102, as described in more detail below, and providing a substantially large enough surface to accommodate a magnetic strip and/or visible cardholder information printed thereon, as described in further detail below with regard to FIGS. 2B-3B. It is to be understood that the shape and dimensions of the cut-outs 128 may generally correspond to and compliment the shape and dimensions of the portions 114 of card body 102 such that, in the coupled configuration of FIG. 1A, the portions 114 and cut-outs 128 may nest together. In other words, the size, shape, and orientation of the cut-outs 128 may be selected to correspond to the size, shape, and orientation of the portions 114, and vice versa.

FIG. 1C depicts a side-perspective view of an exemplary transaction card in a coupled configuration. As shown in FIG. 1C, transaction card 100 includes two flush surfaces in a depth direction D when in a coupled configuration. In some embodiments, portions 114 of card body 102 may have a greater depth in the depth direction than the remainder of the card body 102 that is disposed below the removable sheath in the coupled configuration, as described in greater detail below.

Figure 2A:
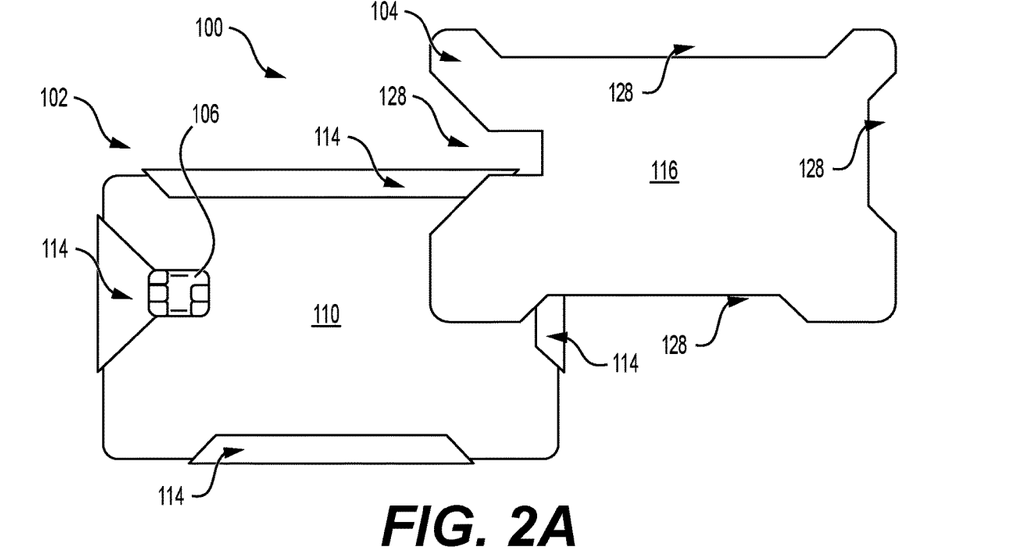
FIG. 2A depicts a front-perspective view of an exemplary transaction card in an uncoupled configuration, consistent with one or more embodiments of the present disclosure.
Figure 2B:
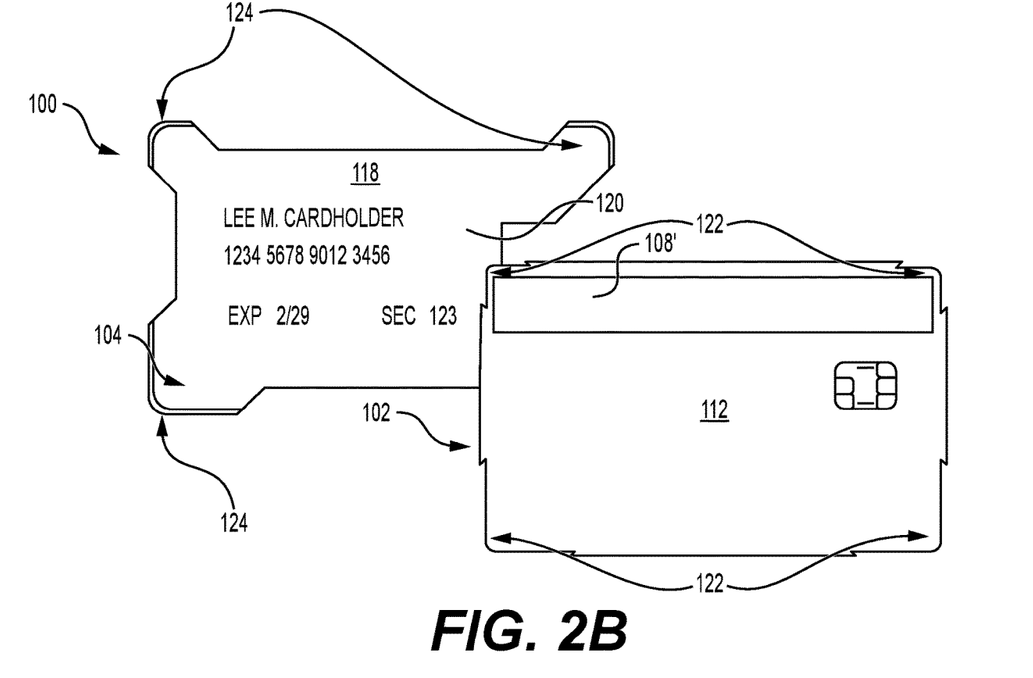
FIG. 2B depicts a rear-perspective view of an exemplary transaction card in an uncoupled configuration, consistent with one or more embodiments of the present disclosure.

FIGS. 2A-2B depict transaction card 100 in an uncoupled configuration. As shown in FIG. 2A, card body 102 includes a primary portion with surface 110 that is covered by the removable sheath 104 in a coupled configuration and portions 114 that are exposed in both coupled and uncoupled configurations. Card body 102 may include an EMV chip 106 on the front-facing surface 110 or on a rear-facing surface 112, as shown in FIG. 2B. Rear-facing surface may also include a magnetic strip 108'. In some embodiments, a magnetic strip 108 may be disposed on the removable sheath 104. In other embodiments, a magnetic strip 108' is disposed on the card body 102. In yet other embodiments, magnetic strips 108, 108' are disposed on both the removable sheath 104 and the card body 102, and may be disposed on any of the front-facing surfaces of either card body 102 or removable sheath 104, and any of rear-facing surfaces of either card body 102 or removable sheath 104, and any combination thereof.

Card body 102 and removable sheath 104 are configured to be securely coupled to each other when in the coupled configuration, yet removable from each other with a small amount of force applied by a cardholder. To this end, the card body 102 and removable sheath 104 are provided with respective receiving and attachment portions. In some embodiments, card body 102 may further include insets 122, which in the embodiment shown in FIG. 2B, may take the form of cut-outs of the card along the edges approaching the corners. The insets 122 may be configured to receive corresponding raised portions 124 formed on the removable sheath 104. Coupling the card body 102 to the removable sheath 104 may be achieved by inserting each of the raised portions 124 of removable sheath into a corresponding inset 122 of card body 102, and uncoupling the card body 102 from the removable sheath 104 is likewise achieved by removing the raised portions 124 from insets 122, as described in more detail in FIGS. 3A and 3B.

Figures 3A, 3B:
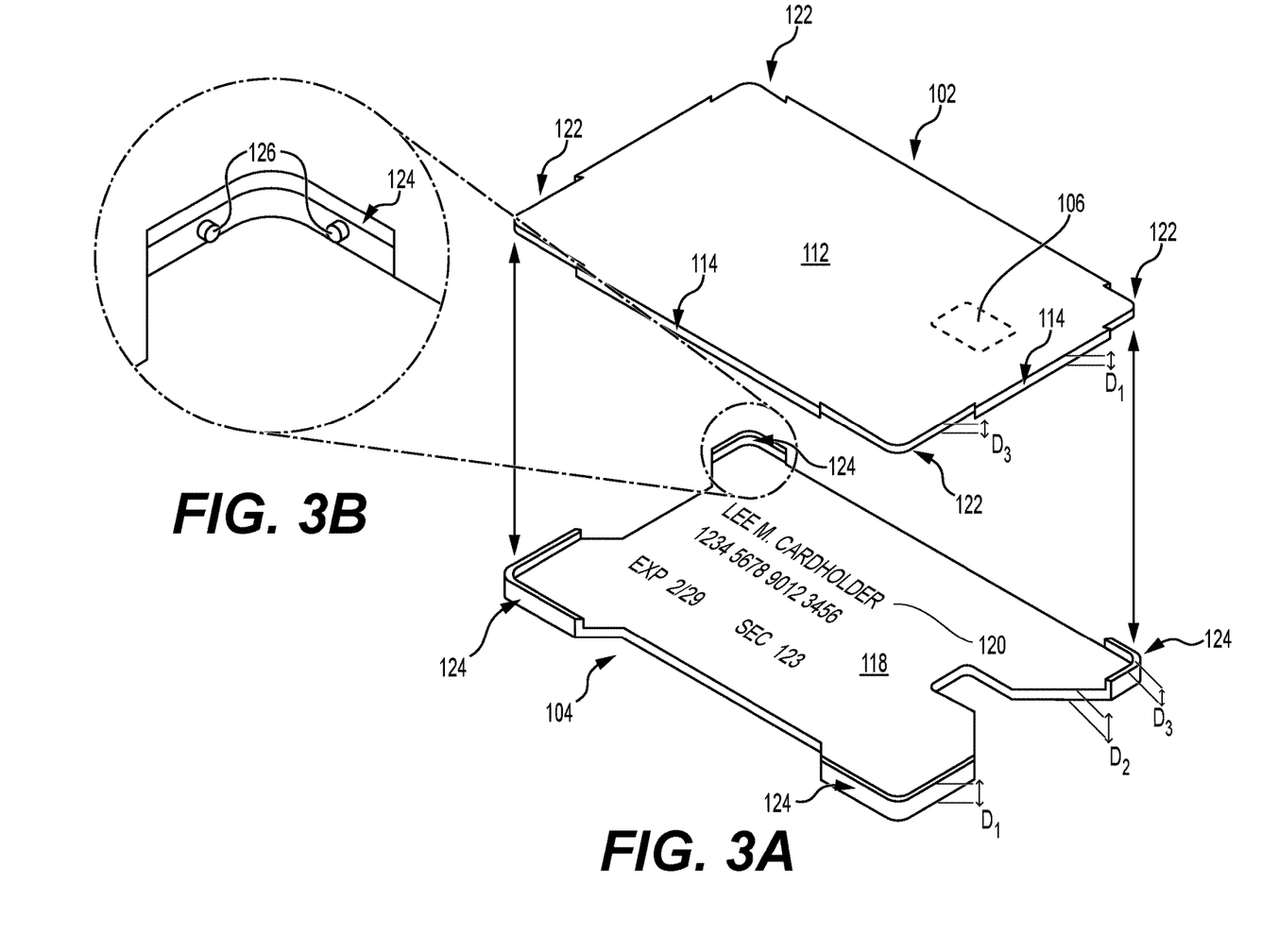
FIG. 3A depicts a rear-perspective isometric view of an exemplary transaction card in an uncoupled configuration, consistent with one or more embodiments of the present disclosure.
FIG. 3B depicts a close-up perspective view of a portion of the exemplary transaction card of FIG. 3A.

At portions 114, card body 102 may have a first depth $D_1$ extending in a depth direction as shown in FIG. 3A, while the removable sheath component may have a second depth $D_2$ in the depth direction, while the raised portions 124 have an additional third depth $D_3$, wherein the first depth $D_1$ is substantially equal to the sum of the second depth $D_2$ and the third depth $D_3$, allowing for a flush finish in the coupled configuration, as shown in the side view of FIG. 1C. The portions of card body 102 outside of portions 114 also have a depth $D_3$ to match the depth of raised portions 124.

As described above, removable sheath 104 may include visible cardholder information 120 (FIG. 2B) printed on a surface 118 of the removable sheath that is obfuscated by the card body 102 in a coupled configuration. The visible cardholder information 120 may include, for example, the cardholder's name, a card number, an expiration date, a CCV number, and/or other elements of information associated with the transaction card 100 or an account associated therewith. In the coupled configuration shown in FIGS. 1A and 1B, the card body 102 obfuscates the visible cardholder information 120, protecting the visible cardholder information from the view of potential fraudsters. If the cardholder wishes to or is otherwise required to provide a transaction card to a third party, such as when conducting a transaction by providing a transaction card to a waiter at a restaurant, the cardholder may uncouple the card body 102 from the removable sheath and provide the card body 102, which is configured to be used as active tender, to the third party, while securely retaining the removable sheath 104 that includes the visible cardholder information.

To provide for secure coupling of the card body 102 to the removable sheath 104, the raised portions 124 may include one or more tabs 126 (FIG. 3B) which may be comprised of a resilient material such as silicone or rubber. In a coupled configuration, the insets 122 of card body 102 may be configured to couple to the raised portions 124 and be secured in place by a friction fit between the one or more tabs 126 and the card body 102.

Figure 4A:
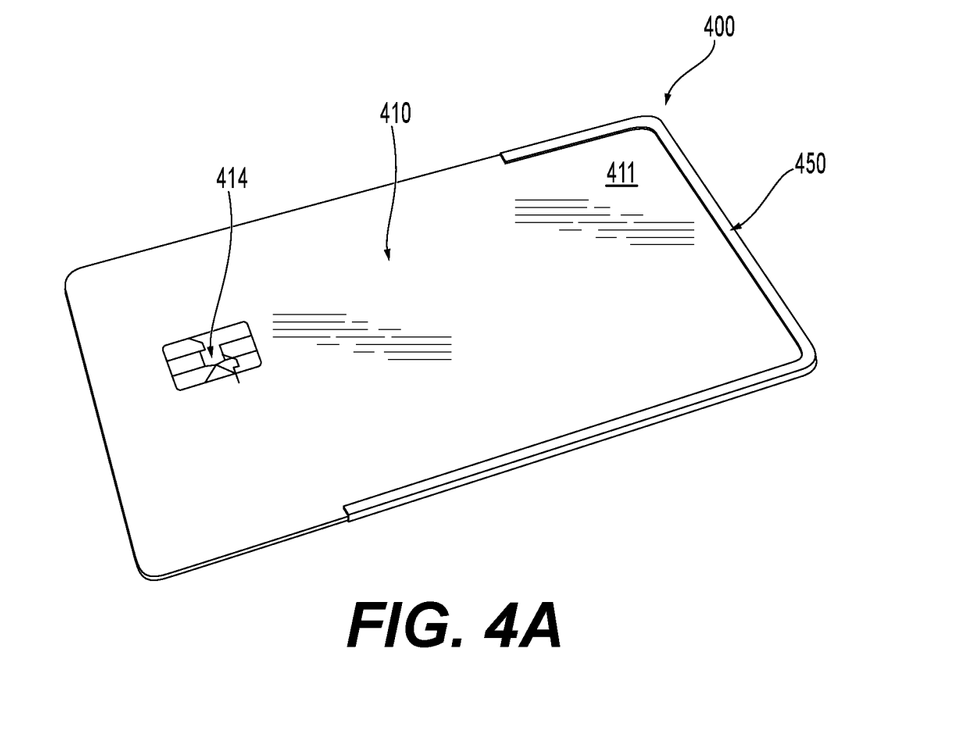
FIG. 4A depicts a front-perspective view of an exemplary transaction card in a coupled configuration, consistent with one or more embodiments of the present disclosure.
Figure 4B:
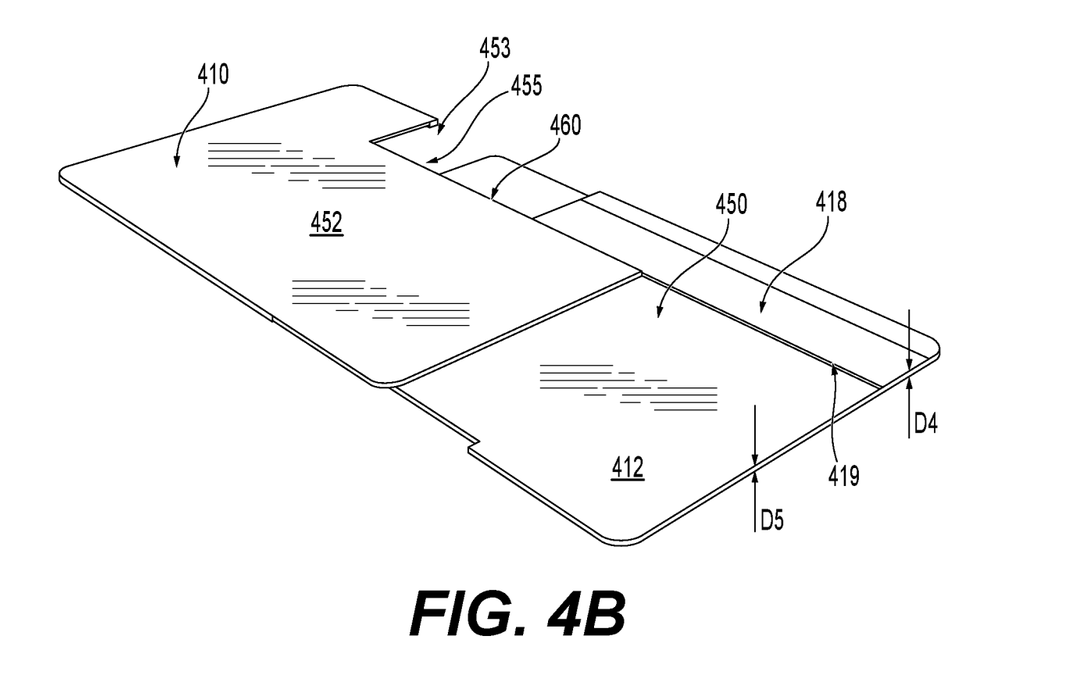
FIG. 4B depicts a rear-perspective view of an exemplary transaction card in a transition between a coupled configuration and an uncoupled configuration, consistent with one or more embodiments of the present disclosure.
Figure 4C:
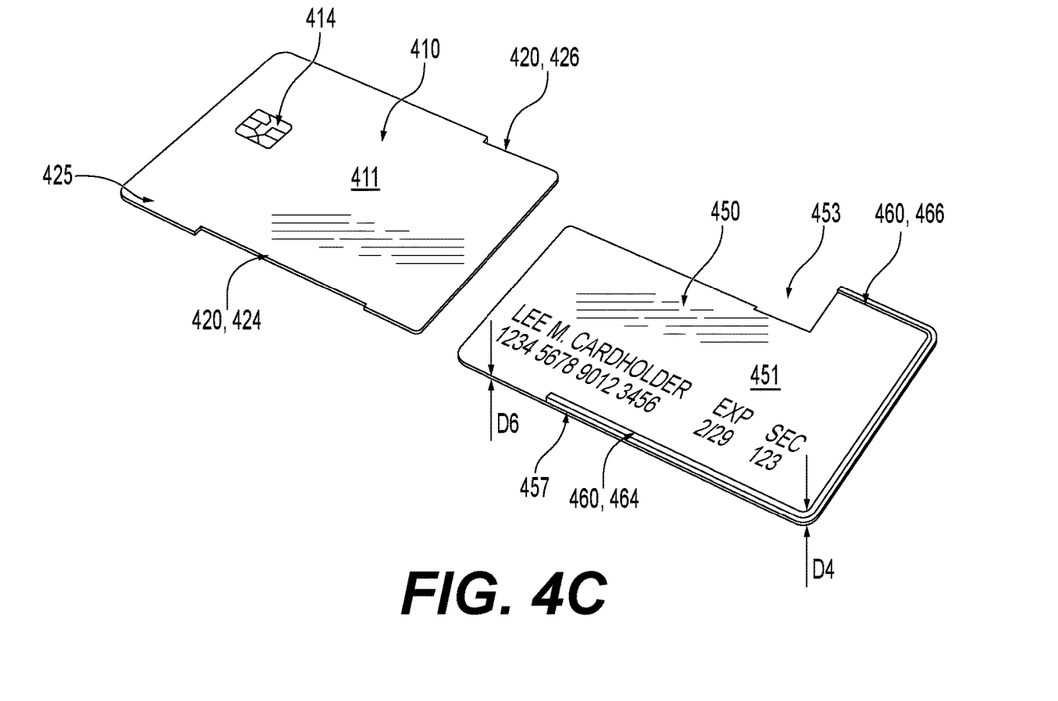
FIG. 4C depicts a front-perspective view of an exemplary transaction card in an uncoupled configuration, consistent with one or more embodiments of the present disclosure.

FIGS. 4A-4C show a transaction card 400 according to a further embodiment including a card body 410 and a removable sheath 450. FIG. 4A is a front-perspective view of the transaction card 400 in a coupled configuration and depicts a front face 411 of the card body 410. In the coupled configuration, card body 410 and removable sheath 450 are engaged to each other and together form a single transaction card 400.

FIG. 4B is a back-perspective view of the transaction card 400 as card body 410 and removable sheath 450 are being slidably engaged with or disengaged from each other, and depicts a back face 412 of the card body 410 and a back face 452 of the removable sheath 450. The back face 412 of the card body 410 is opposite the front face 411 of the card body 410, and the back face 452 of the removable sheath 450 is opposite the front face 451 (see FIG. 1C) of the removable sheath 450.

The card body 410 may likewise be composed of any relatively light-weight, rigid, material, such as a plastic material, and may include thereon an EMV chip 414, an antenna (not shown) for conducting wireless transactions, and a magnetic strip 418. In the exemplary embodiment, the EMV chip 414 is disposed on the front face 411 of card body 410, and the visible cardholder information 116 and the magnetic strip 418 are located on the back face 412 of the card body 410. In some embodiments, EMV chip 414 and magnetic strip 418 may be disposed on either, neither, or both of the front face 411 and back face 412 of the card body 410.

In the exemplary embodiment, the EMV chip 414 being disposed on the front face 411 causes it to be visible even in the coupled configuration, and the magnetic strip 418 remains visible even though it is disposed on the back face 412 of card body 410 by virtue of a cut-out portion 453 formed in the removable sheath 450 formed to correspond to the magnetic strip 418 formed on the card body 410. The magnetic strip 418 may be less than the full length of the transaction card 400 as shown in FIG. 4B, with the cut-out portion 453 corresponding to the length of the magnetic strip 418. In some embodiments, the magnetic strip 418 is between 50% and 100% the length of the transaction card 400. It is to be understood that the shape and dimensions of the cut-out portion 453 may generally correspond to and compliment the shape and dimensions of the magnetic strip 418 such that, in the coupled configuration of FIG. 4A, the magnetic strip 418 and cut-out portion 453 may nest together. In other words, the size, shape, and orientation of the cut-out portion 453 may be selected to correspond to the size, shape, and orientation of the magnetic strip 418, and vice versa.

For example, card body 410 may include a varied depth such that a first portion of card body 410 including the magnetic strip 418 may have a first depth $D_4$ while a second portion of the card body 410 excluding the magnetic strip 418 may have a second depth $D_5$. The first depth $D_4$ may be thicker than the second depth $D_5$. As such, an edge surface 419 of the first portion of the card body 410 (or an edge surface of the magnetic strip 418) may be arranged so as to abut or otherwise contact an edge surface 455 of cut-out portion 453 in the coupled configuration.

In another example, the removable sheath 450 may also have a first portion that may have a first depth $D_4$ matching the first depth $D_4$ of the portion of the card body 410 including the magnetic strip 418, the first portion forming a frame that corresponds to and complements the shape of a lip 425 arranged on the card body 410, such that in the coupled configuration shown in FIG. 4A, the frame 457 and lip 425 may nest together. In other words, the size, shape, and orientation of the lip 425 may be selected to correspond to the size, shape, and orientation of the frame 457, and vice versa. The remainder of the removable sheath 450 may have a third depth $D_6$, wherein the first depth $D_4$ is greater than the third depth $D_6$, and the second depth $D_5$ and third depth $D_6$ together are substantially equal to the first depth $D_4$.

In some embodiments, the EMV chip 414 may be disposed on the back face 412 of the card body 410 rather than the front face 411, and the removable sheath 450 may lack the cut-out portion and be substantially rectangular such that it covers the entire back face 412 of the card body. In such embodiments, in a coupled position, the removable sheath 450 may completely obfuscate all of the EMV chip 414 and the magnetic strip 418. The removable sheath 450 may further be comprised of a mesh material of conductive wires for blocking external electromagnetic fields, such that an antenna on the card body is blocked from communication, disabling the transaction card 400 for use as active tender in a coupled configuration.

In yet other embodiments, the removable sheath 450 may include a magnetic strip on its back face 452, such that even in the coupled configuration with the magnetic strip 418 of the card body 410 obfuscated, the transaction card 400 may still be usable as tender based on the exposed magnetic strip of the weighted card component while the remaining elements (EMV chip, antenna, visible cardholder information) are still blocked from the view of potential fraudsters and RFID skimming technologies.

FIG. 4C depicts the card body 410 and removable sheath 450 in a completely uncoupled configuration. In such a configuration, a cardholder has the option to carry only one of card body 410 and removable sheath 450, and either or both of them may include elements so that they are usable as tender. As shown in FIG. 4C, card body 410 may include an EMV chip 414 on its front face 411. Not shown in FIG. 1C, magnetic strip 418 may also be located on the back face 412 of the card body 410 and an antenna may be included to allow for touch-free transactions. The removable sheath 450 may include cardholder information and a magnetic strip (not shown), such that the removable sheath 450 may be usable as tender independently as well. This may be useful in situations in which the card body becomes lost or misplaced or is otherwise determined not to be used by the cardholder.

Figure 5A:
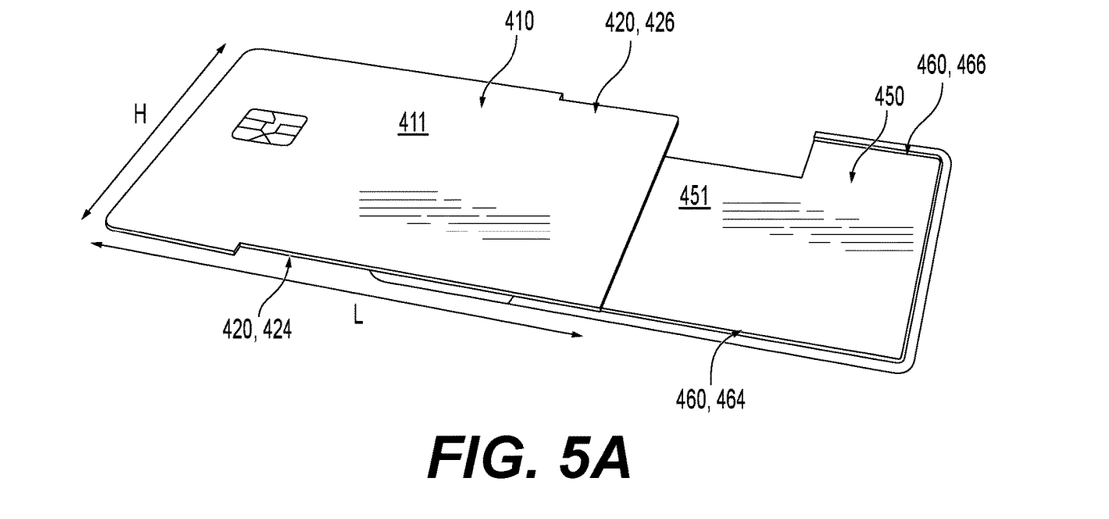
FIG. 5A depicts a front-perspective view of an exemplary transaction card in a transition between a coupled configuration and an uncoupled configuration, consistent with one or more embodiments of the present disclosure.

The card body 410 and the removable sheath 450 are coupled and uncoupled from each other based on the interaction of a receiving portion 420 disposed on the card body 410 and an attachment portion 460 disposed on the removable sheath 450. In an exemplary embodiment shown in FIG. 5A, the receiving portion 420 is formed on the card body 410 and the attachment portion 460 is formed on the removable sheath 450.

The card body 410 and the removable sheath 450 are both substantially rectangular with a substantially similar height H extending in the vertical direction and a substantially similar length L extending in the horizontal direction perpendicular to the vertical direction, with the length L being greater than the height H. The receiving portion 420 is formed on the horizontal edges 424, 426 of the card body 410 and includes a groove 422 (see FIG. 5B) formed in a horizontal direction on each of the horizontal edges 424, 426. The attachment portion 460 is formed on the horizontal edges 464, 466 of the removable sheath 450 and includes a respective track 462 (see FIG. 5B) on each of the horizontal edges 464, 466 that is received in a respective groove 422 formed on a respective horizontal edge 424, 426 of the card body 410.

Figure 5B:
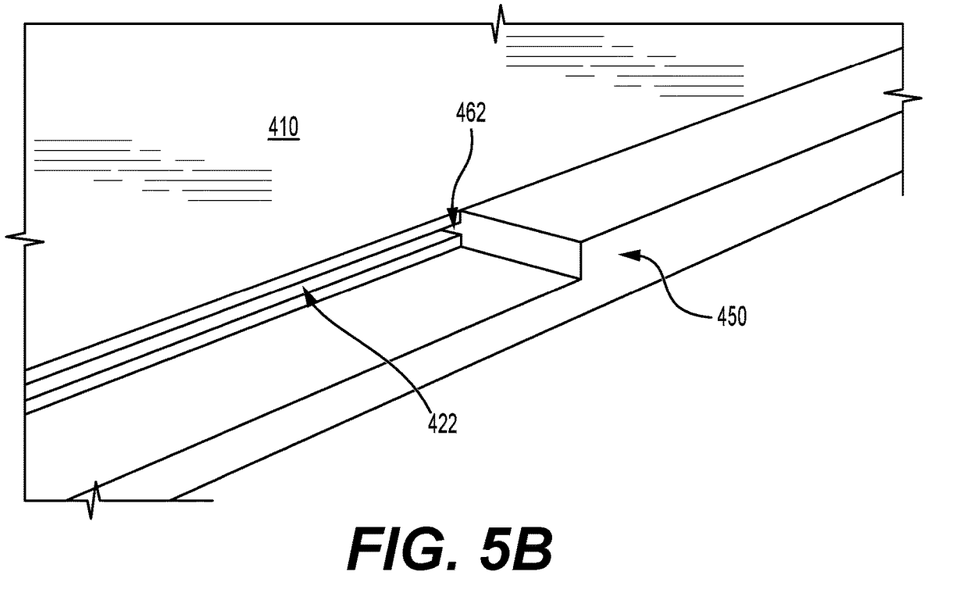
FIG. 5B depicts a view of an attachment portion and a receiving portion of the transaction card, consistent with one or more embodiments of the present disclosure.

As shown in FIG. 5B, track 462 may be inserted into groove 422, allowing attachment portion 460 to engage with receiving portion 420 such that the removable sheath 450 and card body 410 are slidably movable relative to each other and become slidably engaged with each other. A cardholder may then transition the transaction card 400 between a coupled configuration shown in FIG. 4A and an uncoupled configuration shown in FIG. 4B by sliding the removable sheath 450 and card body 410 relative to each other as shown in FIGS. 4B and 4C.

In some embodiments, the grooves 422 may be formed on the vertical edges of the card body and the tracks 462 may be formed on the vertical edges of the weighted card component, such that when the track 462 is inserted into groove 422, allowing attachment portion 460 to engage with receiving portion 420, the removable sheath 450 and card body 410 become slidably engaged with each other in the vertical direction rather than the horizontal direction.

Figure 5C:
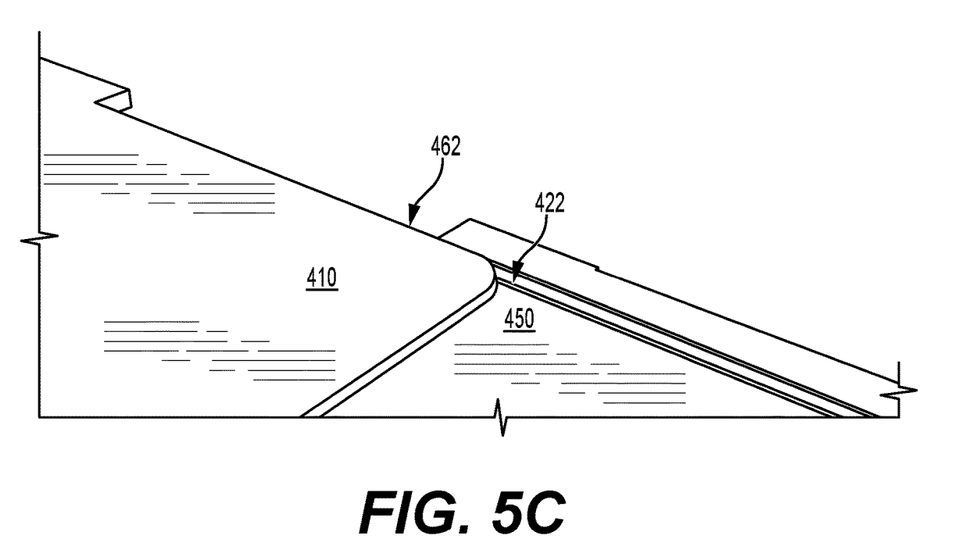
FIG. 5C depicts a view of an attachment portion and a receiving portion of the transaction card, consistent with one or more embodiments of the present disclosure.

In some embodiments shown in FIG. 5C, the grooves 422 may be formed on the removable sheath 450 and the tracks 462 may be formed on the card body 410. The arrangement is otherwise substantially similar to that of FIG. 5B with the grooves 422 and tracks 462 reversed. Namely, track 462 may be inserted into groove 422, allowing attachment portion 460 to engage with receiving portion 420 such that the removable sheath 450 and card body 410 become slidably engaged with each other. A cardholder may then transition the transaction card 400 between a coupled configuration shown in FIG. 4A and an uncoupled configuration shown in FIG. 4B by sliding the removable sheath 450 and card body 410 relative to each other as shown in FIGS. 4B and 4C.

A friction fit allows the removable sheath 450 and the card body 410 to remain connected to each other in a coupled configuration, requiring at least a small amount of force to separate the two from each other to uncouple the components. In some embodiments, magnetic force may also be used to keep the weighted card component and the card body in place in the coupled arrangement. The attachment portion 460 may include one or more first magnets, and the receiving portion may include one or more second magnets, and in the first, coupled configuration, the removable sheath 450 may be coupled to the card body 410 by an attraction between the one or more first magnets and the one or more second magnets.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. In the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above-disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A transaction card assembly, comprising:
   a card body comprising a Europay, Mastercard, and Visa (EMV) chip and a receiving portion;
   a removable sheath component comprising visible cardholder information and an attachment portion;
   wherein, in a first configuration, the removable sheath component is coupled to the card body via engagement between the receiving portion and the attachment portion, and in a second configuration, the removable sheath component is uncoupled from the card body by disengagement between the attachment portion and the receiving portion, and
   wherein, in the first configuration, the visible cardholder information is obfuscated by the card body.

2. The transaction card assembly of claim 1, wherein a first magnetic strip is disposed on the card body and/or a second magnetic strip is disposed on the removable sheath component.

3. The transaction card assembly of claim 1, wherein the card body is substantially rectangular with four corner portions, with a height extending in a vertical direction, and a length extending in a horizontal direction perpendicular to the vertical direction, wherein the length is greater than the height;
   the receiving portion comprises at least one inset formed in at least one of the four corner portions;
   the attachment portion comprises at least one raised portion formed on the removable sheath component configured to be inserted into the at least one inset.

4. The transaction card assembly of claim 3, wherein
   the card body has a first depth extending in a third direction perpendicular to the horizontal direction and perpendicular to the vertical direction;
   the removable sheath component has a second depth extending in the third direction; and
   the raised portion has a third depth extending in the third direction; wherein
   the first depth is substantially equal to a sum of the second depth and the third depth.

5. The transaction card assembly of claim 1, wherein
   the receiving portion comprises one or more silicone tabs; and
   in the first configuration, the removable sheath component is coupled to the card body by a friction fit between the one or more silicone tabs and the card body.

6. The transaction card assembly of claim 1, wherein
   the card body is substantially rectangular with a height extending in a vertical direction and a length extending in a horizontal direction perpendicular to the vertical direction, wherein the length is greater than the height;
   the receiving portion comprises a groove formed in the horizontal direction; and
   the removable sheath component is slidably movable relative to the card body in the horizontal direction.

7. The transaction card assembly of claim 1, wherein
   the card body is substantially rectangular with a height extending in a vertical direction and a length extending in a horizontal direction perpendicular to the vertical direction, wherein the length is greater than the height;
   the receiving portion comprises a groove formed in the vertical direction; and
   the removable sheath component is slidably movable relative to the card body in the vertical direction.

8. The transaction card assembly of claim 1, wherein
   the card body is formed of a rigid plastic material, and the removable sheath component is formed of a metal material.

9. The transaction card assembly of claim 1, wherein the card body is formed of a rigid plastic material, and the removable sheath component is formed of a silicone material.

10. A transaction card assembly, comprising:
a card body comprising a first face and a second face opposite the first face;
a Europay, Mastercard, and Visa (EMV) chip disposed on the first face of the card body;
a magnetic strip disposed on the second face of the card body;
a receiving portion formed on the card body; and
a removable sheath component comprising a first sheath face and a second sheath face opposite the first sheath face;
visible cardholder information disposed on the first sheath face of the removable sheath component;
an attachment portion formed on the removable sheath component;
wherein, in a first configuration, the removable sheath component is coupled to the card body by engagement between the receiving portion and the attachment portion, and in a second configuration, the removable sheath component is uncoupled from the card body by disengagement between the attachment portion and the receiving portion, and
wherein, in the first configuration, the card body obfuscates a portion of the first sheath face of the removable sheath component comprising the visible cardholder information.

11. The transaction card assembly of claim 10, wherein a first magnetic strip is disposed on the card body and/or a second magnetic strip is disposed on the removable sheath component.

12. The transaction card assembly of claim 10, wherein the card body is substantially rectangular with four corner portions, a height extending in a vertical direction, and a length extending in a horizontal direction perpendicular to the vertical direction, wherein the length is greater than the height;
the receiving portion comprises at least one inset formed in at least one of the four corner portions;
the attachment portion comprises at least one raised portion formed on the removable sheath component configured to be inserted into the at least one inset.

13. The transaction card assembly of claim 12, wherein the card body has a first depth extending in a third direction perpendicular to the horizontal direction and perpendicular to the vertical direction;
the removable sheath component has a second depth extending in the third direction; and
the raised portion has a third depth extending in the third direction; wherein
the first depth is substantially equal to a sum of the second depth and the third depth.

14. The transaction card assembly of claim 10, wherein the receiving portion comprises one or more silicone tabs; and
in the first configuration, the removable sheath component is coupled to the card body by a friction fit between the one or more silicone tabs and the card body.

15. The transaction card assembly of claim 10, wherein the card body is substantially rectangular with a height extending in a vertical direction and a length extending in a horizontal direction perpendicular to the vertical direction, wherein the length is greater than the height;
the receiving portion comprises a groove formed in the horizontal direction; and
the removable sheath component is slidably movable relative to the card body in the horizontal direction.

16. The transaction card assembly of claim 10, wherein the card body is substantially rectangular with a height extending in a vertical direction and a length extending in a horizontal direction perpendicular to the vertical direction, wherein the length is greater than the height;
the receiving portion comprises a groove formed in the vertical direction; and
the removable sheath component is slidably movable relative to the card body in the vertical direction.

17. The transaction card assembly of claim 10, wherein the card body is formed of a rigid plastic material, and the removable sheath component is formed of a metal material.

18. The transaction card assembly of claim 10, wherein the card body is formed of a rigid plastic material, and the removable sheath component is formed of a silicone material.

19. A transaction card assembly, comprising:
a card body comprising a Europay, Mastercard, and Visa (EMV) chip and a receiving portion;
a removable sheath component comprising visible cardholder information and an attachment portion;
wherein, in a first configuration, the removable sheath component is coupled to the card body via engagement between the receiving portion and the attachment portion, and in a second configuration, the removable sheath component is uncoupled from the card body by disengagement between the attachment portion and the receiving portion, wherein:
in the first configuration, the visible cardholder information is obfuscated by the card body, and
in the second configuration, the removable sheath is removed from the card body, and the removable sheath and the card body are both enabled for active use as tender.

20. The transaction card assembly of claim 19, wherein, in the second configuration, the removable sheath is enabled for active use as tender via the visible cardholder information and a magnetic strip, and the card body is enabled for active use as tender via the EMV chip.

* * * * *